Dec. 16, 1952      E. D. CROSS      2,621,494
COUPLING

Filed July 14, 1950      2 SHEETS—SHEET 1

Inventor
Edward D. Cross
by Roberts, Cushman & Grover
att'ys.

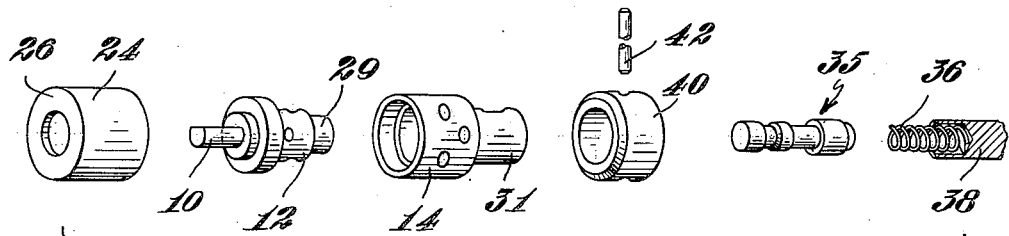
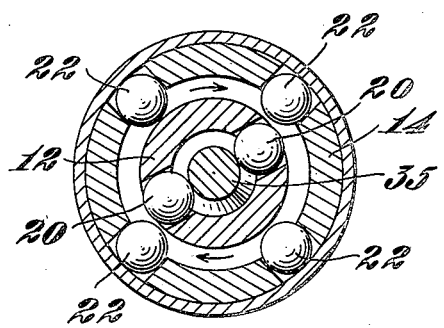
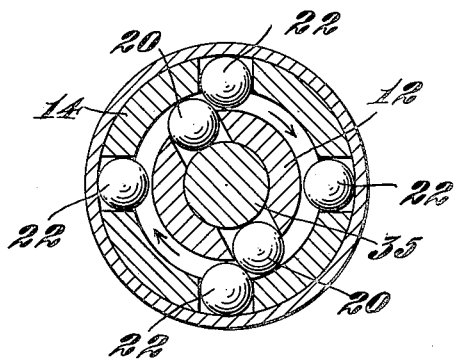
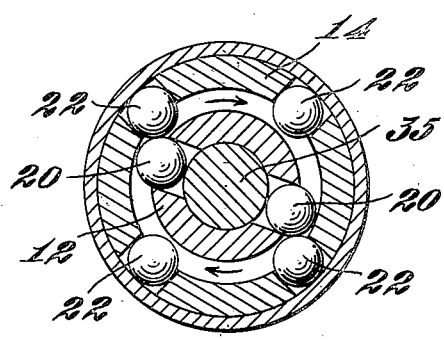
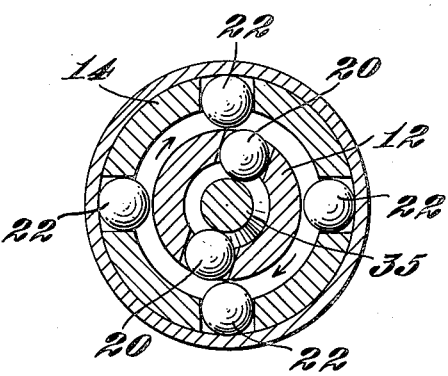

Patented Dec. 16, 1952

2,621,494

UNITED STATES PATENT OFFICE 2,621,494

COUPLING

Edward D. Cross, Brockton, Mass., assignor to Alden Products Co., Brockton, Mass., a corporation of Massachusetts Application July 14, 1950, Serial No. 173,726

11 Claims. (Cl. 64—24)

1

This invention relates to couplings for mechanically connecting two rotatory elements and more particularly to step couplings whereby the relative angular position or phase of the elements is changeable at will.

Objects of this invention are to provide an improved coupling which mechanically interconnects two rotatory elements or shafts, which permits the phase relationship between the elements to be varied at will, which is adapted to high speed operation, which is simple in operation, which is strong and durable in construction, and which advances the art generally.

In a broad aspect the invention contemplates a driving member or shaft having integrally formed therewith or attached thereto a cage which is coaxially arranged with respect to a similar cage attached to a driven member. Each of the cages has a plurality of equally spaced apertures therein arranged in two equally spaced rows about the periphery of respective cages. Each of the cage apertures carries a respective rotatory element such as a roller or ball, the cages being axially arranged with corresponding rows of elements coplanary positioned so that either row of elements of one of the cages can be selectively moved radially at will, for example by cam means, to be brought into contact with the corresponding row of elements in the other cage, the angular relationship between the driving and driven members varying upon the change of driving contact from one row of elements to the second row of elements by an angle equal to the angular displacement between the elements in the respective rows.

In a more specific aspect the cam means urges the balls of the inner cage outwardly such means comprising operative surfaces located on either side of a groove located near one end of an actuator which is biased by a spring so that one operative surface extends within the inner cage to contact one row of balls thus normally moving the balls outwardly into driving contact with the corresponding balls carried in the outer cage, the balls of the second row in the inner cage being moved into the groove. Upon axial movement of the actuator, for example by means of an armature attracted by the flux from an electromagnet, the balls in the first row of the inner cage move into the groove and the balls of the second row are moved radially outwardly into driving contact with the corresponding balls in the outer cage, the change in driving contact from one to the other row of driving balls resulting in an angular slip or phase displacement between the driven and driving members.

2

Further objects relate to various features of construction and will be apparent from the consideration of the following description and accompanying drawings wherein Fig. 1 is a side elevation view in partial section of one embodiment of the invention;

Fig. 4 is an exploded isometric view of the mechanical elements of the coupling;

Fig. 5 is a sectional view on line 5—5 of Fig. 2;

Fig. 6 is a sectional view on line 6—6 of Fig. 2;

Fig. 7 is a sectional view on line 7—7 of Fig. 3; and

Fig. 8 is a sectional view on line 8—8 of Fig. 3.

The embodiment of the invention chosen for the purpose of illustration is a step coupling particularly adapted for use in a facsimile recorder wherein a drum carrying a helical electrode must be brought not only into synchronism with a corresponding drum at a sending station, but the picture must also be "framed" by bringing the sending and recording drums into the same mechanical phase relationship although it is to be distinctly understood that neither such embodiment nor the principles of operation thereof are limited to this application but can be applied in any situation wherein it is necessary to vary the angular relationship between two aligned shafts or rotatory elements.

Figure 2:
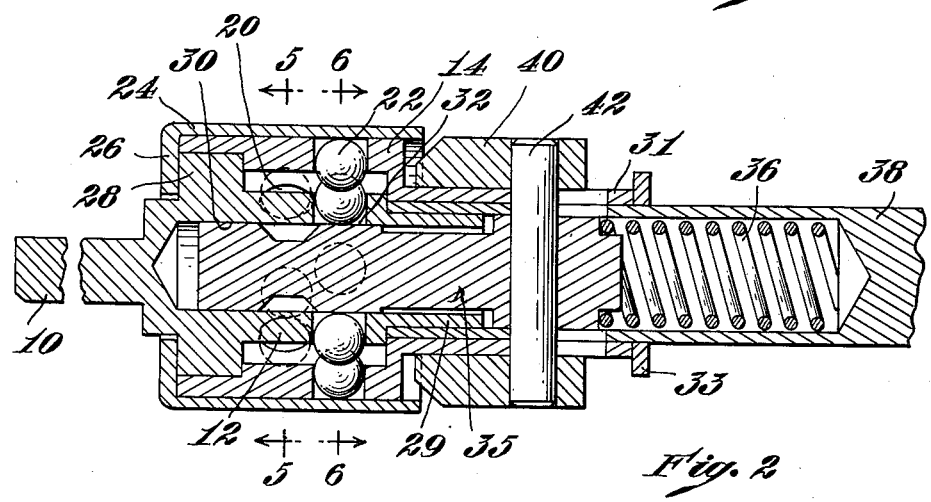
Fig. 2 is an enlarged partial sectional view with the armature in the deenergized position.
Figure 3:
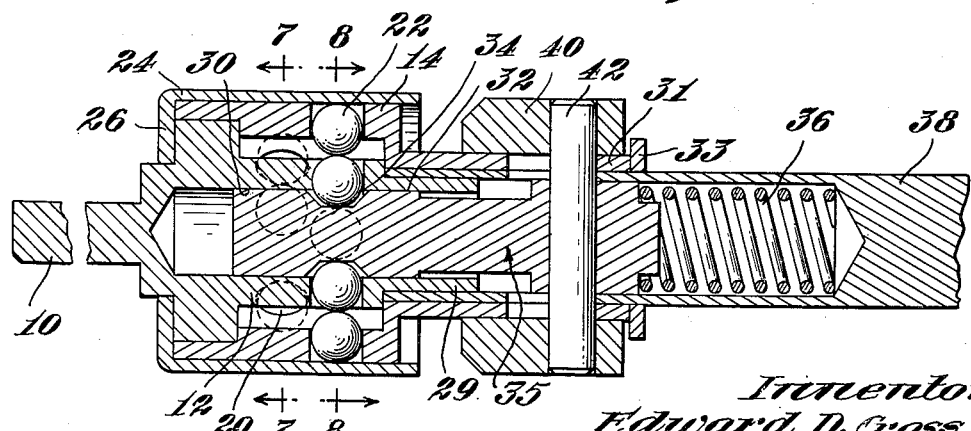
Fig. 3 is a similar partial sectional view to that shown in Fig. 2 with the armature in the energized position.

Referring particularly to Figs. 2 and 4, the coupling illustrated comprises a driving member such as the input shaft 10 having integrally formed therewith an inner cage 12 in whose periphery are located four equally spaced apertures which are arranged in two axially spaced rows, the apertures in one of the rows being positioned at ninety degrees from the apertures in the second row. Arranged coaxially with the inner cage 12 is an outer cage 14 having eight apertures arranged in two axially spaced rows of four equally spaced apertures. The cages 12 and 14 are positioned axially so that the two rows of apertures in the respective cages are coplanar as is shown in Figs. 2 and 3.

In each of the apertures in the inner cage 12 is carried a respective ball 20. Similar balls 22 in the apertures in the outer cage 14 are restrained by means of an outer shell 24 (Figs. 2 and 3) which has an inwardly turned lip or flange 26 at one end thereof which bears against the outer side of a collar 28 extending from the driving shaft 10 which acts as a thrust bearing for preventing axial movement of the cages. The periphery of the collar 28 engages the wall of a stepped recess in the end of the outer cage 14 to act as a bearing surface between the driving shaft 10 and the cage. The opposite end of the inner cage 12 from the driving shaft 10 is provided with an extension or hub 29 whose outer surface is in bearing contact with the inner surface of a hollow driven shaft 38. The outer surface of the shaft 38 is inserted within the recess of a hollow extension 31 from the end of the outer cage 14. The end of the extension 31 is provided with a thrust washer 33.

The balls 20 carried in the aperture in the inner cage 12 are prevented from escaping inwardly by one end of an actuator 35 having a groove 34 the sides of which form two surfaces for reciprocally engaging the inner surface of the cage. The other end of the actuator 35 acts as a seat for a biasing spring 36 whose other end bears against the bottom of the recess in the driven shaft 38 so that the actuator 35 is normally positioned as is shown in Fig. 2 with the surface 32 bearing against the two balls 20 in the right hand row of the inner cage 12 to bring these balls into driving contact with two of the corresponding balls 22 in the outer row as is shown in Fig. 6. The balls 20 in the other row of the inner cage 12 are free to drop into the groove 34 so that they do not bear against the balls 22 in the outer cage 14 as is shown in Fig. 5.

An armature 40 of soft iron in the form of an annular ring is slidably positioned circumjacent the extension 31 from the outer cage 14. The armature 40 is connected to the spring end of the actuator 35 by means of a pin 42 which also extends through elongated slots in the extension 31 from the outer cage 14 and in the driven shaft 38 so that the shaft cage, armature, and actuator rotate as a single unit but permit axial movement of the armature and actuator with respect to the shaft and cage.

Figure 1:
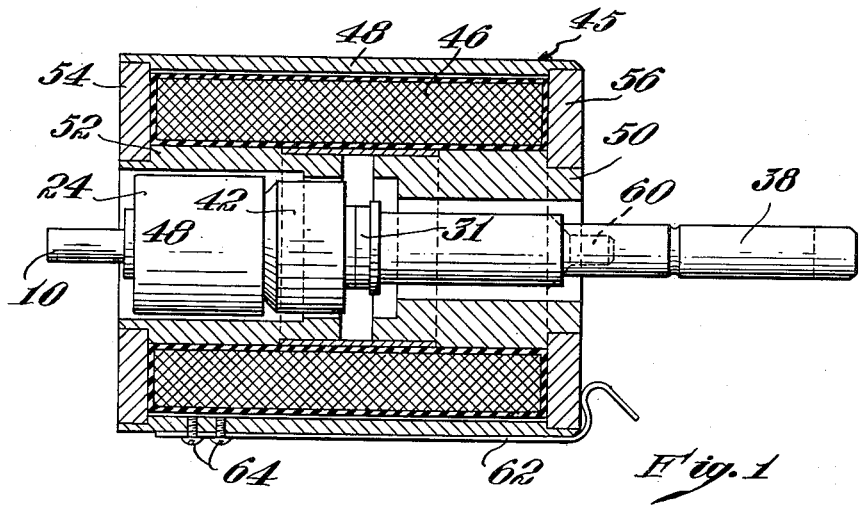

The armature 40 and therefore the actuator 35 are moved axially against the biasing force of the spring 36 by the flux created by means of a surrounding electromagnet assembly 45. As shown in Fig. 1 the electromagnetic assembly comprises an electric solenoid 46 which is surrounded by a shell 48. A pole piece 50 is inserted in one end of the central aperture of the solenoid 46. A second pole piece 52 is similarly inserted in the opposite end of the aperture, the length of the pole pieces being such that an air gap results therebetween. The respective ends of the shell 48 and the pole pieces 50 and 52 are recessed to receive two annular discs 54 and 56. The disc 54 is maintained in place by peening over the end of the shell in several spots. The other disc 56 is permanently secured to a supporting structure or bracket (not shown) by means of cap screws 60. The electromagnetic assembly 45 is secured to the disc 56 by an offset at one end of a leaf spring 62 whose opposite end is secured to the outer surface of the shell 48 by means of screws 64.

The shafts 10 and 38 are journaled in respective bearings (not shown) which are positioned so that the rotatary portion of the coupling is located with respect to the electromagnetic assembly 45 as is shown in Fig. 1 whereby with the solenoid 46 deenergized the armature 40 is moved beneath the pole piece 52 by the force of the spring 36. With the armature 40 in this position the surface 30 maintains the balls 20 in the right hand row of the inner cage 12 in the raised position shown in Fig. 2 so that the balls are brought into driving contact with two of the balls in the corresponding row of the outer cage 14 as is shown in Fig. 6. The balls 20 in the other row of the inner cage 12 drop into the groove 34 as is shown in Fig. 5 so that they do not come into contact with the balls in the outer cage 14.

Upon energization of the solenoid 46 the armature 40 moves into the air gap between the pole pieces 50 and 52 thereby to move the actuator 35 to the position shown in Fig. 3. In this position the balls in the left-hand row of the inner cage 12 are maintained radially outwardly by means of the bearing surface 30 into driving contact with two of the balls 22 in the corresponding row of the outer cage 14 as is shown in Fig. 7. The balls 20 in the right hand row of the inner cage drop into the groove 34.

From the above it will be apparent because of the angular displacement of the balls in the respective rows, the change in driving contact between the balls in the respective rows results in an angular slip of 45 degrees between the driving and driven shafts upon the energization of the solenoid. Conversely upon the deenergization of the solenoid 46, the spring 36 returns the actuator 35 to its original position thereby to cause an additional angular displacement of 45 degrees between the driving and driven shafts so that momentary energization of the solenoid 46 causes a total slip or step of 90 degrees.

It should be understood that the present disclosure is for the purpose of illustration only and that this invention includes all modifications and equivalents which fall within the scope of the appended claims.

I claim:

1. A step coupling comprising a driven member having a cage, a driving member having a cage arranged coaxially with respect to the cage of the driven member, each of said cages including a plurality of apertures arranged in two axially spaced rows, a plurality of rotatable elements each of which is carried in a respective aperture, and means for moving the elements in one cage with respect to the elements in the other cage, the elements in the respective rows being moved relatively in opposite directions whereby the elements in either row are movable at will into driving contact with the elements in the other row, the change in driving contact from one row of elements to the other row of elements resulting in an angular slip between the driven and driving members.

2. A step coupling comprising a driving member having a cage, a driven member having a cage arranged coaxially with respect to the cage of the driving member, each of said cages including a plurality of apertures arranged in two axially spaced rows, the apertures in one row being angularly displaced with respect to the apertures in the second row, a plurality of balls each of which is carried in a respective aperture, and means for radially moving the balls in one cage with respect to the balls in the other cage, the balls in the respective rows being moved relatively in opposite directions whereby the balls in either row are movable at will into driving contact with the balls in the other row, the change in driving contact from one row of balls to the other row of balls resulting in an angular slip between the driven and driving members.

3. A step coupling comprising a driven member having a cage, a driving member having a cage arranged coaxially within the cage of the driven member, each of said cages including a plurality of equally spaced apertures arranged in two axially spaced rows, the apertures in one row being angularly displaced with respect to the apertures in the second row, a plurality of balls each of which is carried in a respective aperture, and means for radially moving the balls in one cage with respect to the balls in the other cage, the balls in the respective rows being moved relatively in opposite directions whereby the balls in either row are movable at will into driving contact, the change in driving contact from one row of balls to the other row of balls resulting in an angular slip between the driven and driving members.

4. A step coupling according to claim 3 wherein the number of apertures in each row of the cage of the driven member is twice the number of apertures in the corresponding rows of the cage of the driving member.

5. A step coupling comprising two coaxially arranged cages one of which is positioned within the other cage, a driven member connected with one of said cages, a driving member connected with the other of said cages, each of said cages including a plurality of equally spaced apertures arranged in two axially spaced rows, the apertures in one row being angularly displaced with respect to the apertures in the second row, a plurality of balls each of which is carried in a respective aperture, and means operable at will for radially moving the balls in either row of the cage of the driving member into driving contact with the corresponding balls in the other cage, the change in driving contact from one row of balls to the other row of balls resulting in an angular slip between the driven and driving members.

6. A step coupling comprising two coaxially arranged cages one of which is positioned within the other cage, a driven member connected with one of said cages, a driving member connected with the other of said cages, each of said cages including a plurality of equally spaced apertures arranged in two axially spaced rows, the apertures in one row being angularly displaced with respect to the apertures in the second row, a plurality of balls each of which is carried in a respective aperture, an actuator having a cammed surface positioned for selectively contacting the balls in either row of apertures of one of the cages thereby radially to move the balls in the cage into driving contact with the corresponding balls in the other cage, and means for operating the actuator whereby the balls in either row of the one cage are movable at will into driving contact with the balls of the corresponding row in the other cage, the change in driving contact from one row of balls to the other row of balls resulting in an angular slip between the driven and driving members.

7. A step coupling comprising an outer cage; an inner cage coaxially positioned within the outer cage; a driven member connected with one of said cages; a driving member connected with the other of said cages; each of said cages including a plurality of equally spaced apertures arranged in two axially spaced rows, the apertures in one row being angularly displaced with respect to the apertures in the second row; a plurality of balls each of which is carried in a respective aperture; an actuator having operative surfaces positioned within the inner cage for selectively contacting the balls in either row of apertures of the inner cage thereby radially to move the balls into driving contact with the corresponding balls in the outer cage, said surfaces forming a groove wherein the balls in the other row of the inner cage move in the opposite direction; and means for operating the actuator whereby the balls in either row of the inner cage are movable at will into driving contact with the balls of the corresponding row in the outer cage, the change in driving contact from one row of balls to the other row of balls resulting in an angular slip between the driven and driving members.

8. A step coupling comprising an outer cage; an inner cage coaxially positioned within the outer cage; a driven member connected with one of said cages; a driving member connected with the other of said cages; each of said cages including a plurality of equally spaced apertures arranged in two axially spaced rows, the apertures in one row being angularly displaced with respect to the apertures in the second row; a plurality of balls each of which is carried in a respective aperture; an actuator having operative surfaces positioned within the inner cage; a spring for biasing the actuator so that one of the operative surfaces selectively contacts the balls in a respective row of apertures of the inner cage thereby radially to move the balls into driving contact with the corresponding balls in the outer cage, the balls in the other row of the inner cage being moved to the opposite direction; and electromagnetic means for axially moving the actuator against the biasing force of the spring whereby the balls in either row of the inner cage are movable at will into driving contact with the balls of the corresponding row in the outer cage, the change in driving contact from one row of balls to the other row of balls resulting in an angular slip between the driven and driving members.

9. A step coupling comprising an outer cage; an inner cage coaxially positioned within the outer cage; a driven member connected with one of said cages; a driving member connected with the other of said cages; each of said cages including a plurality of equally spaced apertures arranged in two axially spaced rows, the apertures in one row being angularly displaced with respect to the apertures in the second row; a plurality of balls each of which is carried in a respective aperture; an actuator having an armature attached to one end thereof and operative surfaces at the other end thereof positioned within the inner cage for selectively contacting the balls in a respective row of apertures in the inner cage thereby radially to move the balls into driving contact with the corresponding balls in the outer cage, the balls in the other row of the inner cage being moved in the opposite direction; and an electromagnet arranged circumjacent said armature for moving the actuator whereby the balls in either row of the inner cage are movable at will into driving contact with the balls of the corresponding outer row in the outer cage, the change in driving contact from one row of balls to the other row of balls resulting in an angular slip between the driven and driving members.

10. A step coupling comprising an outer cage; an inner cage coaxially positioned within the outer cage; a driven member connected with one of said cages; a driving member connected with the other of said cages; each of said cages including a plurality of equally spaced apertures arranged in two axially spaced rows, the apertures in one row being angularly displaced with respect to the apertures in the second row; a plurality of balls each of which is carried in a respective aperture, an actuator having a groove and operative surfaces forming the sides of the groove, said actuator being positioned within the inner cage so that one operative surface normally contacts the balls in the aperture in a first row of the inner cage thereby radially to move the balls into driving contact with the corresponding balls in the other cage, the balls in the other row of the inner cage being moved into the groove; and means for operating the actuator whereby the balls in the other row of the inner cage are movable at will into driving contact with the balls of the corresponding row in the outer cage, the balls in the first row of the inner cage being moved into the groove, the change in driving contact from one row of balls to the other row of balls resulting in an angular slip between the driven and driving members.

11. A step coupling comprising an outer cage; an inner cage coaxially positioned within the outer cage; a driven member connected with one of said cages; a driving member connected with the other of said cages; each of said cages including a plurality of equally spaced apertures arranged in two axially spaced rows, the apertures in one row being angularly displaced with respect to the apertures in the second row; a plurality of balls each of which is carried in a respective aperture; an actuator having an armature at one end and a groove at the other end of the sides of the groove forming operative surfaces, a spring for biasing said actuator so that one operative surface is positioned within the inner cage selectively to contact the balls in the apertures in a first row of the inner cage thereby radially to move the balls into driving contact with the corresponding balls in the other cage, the balls in the other row of the inner cage being moved into the groove; and an electromagnet arranged circumjacent said armature for moving the actuator whereby the balls in the other row of the inner cage are movable at will into driving contact with the balls of the corresponding outer row in the outer cage, the balls in the first row of the inner cage being moved into the groove, the change in driving contact from one row of balls to the other row of balls resulting in an angular slip between the driven and driving members.

EDWARD D. CROSS.

REFERENCES CITED

The following references are of record in the file of this patent:

UNITED STATES PATENTS

| Number | Name | Date |
|---|---|---|
| 817,309 | Flynt | Apr. 10, 1906 |
| 1,647,932 | Pozder | Nov. 1, 1927 |